J. SPEAR.

Base-Burning Stove.

No. 6,207. Reissued Jan. 5, 1875.

Witnesses { Clark M. Garland, Jr. / John F. Grant.

James Spear.
per Edw. Brown
Attorney

N. PETERS, PHOTO-LITHOGRAPHER, WASHINGTON, D. C.

UNITED STATES PATENT OFFICE.

JAMES SPEAR, OF PHILADELPHIA, PENNSYLVANIA.

IMPROVEMENT IN BASE-BURNING STOVES.

Specification forming part of Letters Patent No. 100,335, dated March 1, 1870; reissue No. 5,460, dated June 17, 1873; reissue No. 6,207, dated January 5, 1875; application filed December 3, 1874.

DIVISION B.

*To all whom it may concern:*

Be it known that I, JAMES SPEAR, of 1016 Market Street, Philadelphia, State of Pennsylvania, have invented certain Improvements in Stoves and Heaters, of which the following is a specification:

My invention relates to that class of stoves known as base-burners which have a clinker-cleaning opening between the grate and fire-chamber; and the particular feature of my invention relates to the manner of supporting the grate-surface with respect to the clinker-discharging end of the fire-chamber, to effect the discharge of the slate and clinkers outwardly and over the circumference to the said grate into the ash-pit beneath.

In a patent bearing even date herewith, and designated Division A, I have shown and described a grate-surface supported from the wall of the stove below a clinker-cleaning opening.

The invention herein described consists in the combination of a ring forming a part of the grate-surface, an intervening vertical clinker-cleaning opening above the ring, and lugs supporting the ring from the fire-chamber. Also, in the combination of the elements of the preceding clause with a vibrating or dumping grate within the ring. Also, in a grate-surface projecting beyond the interior diameter of the clinker-discharge end of the fire-chamber, supported by lugs projecting downward from the said fire-chamber at a distance sufficient for the removal of slate and clinkers from the surface of the grate by the insertion of a poker through the intervening opening.

Figure 1:
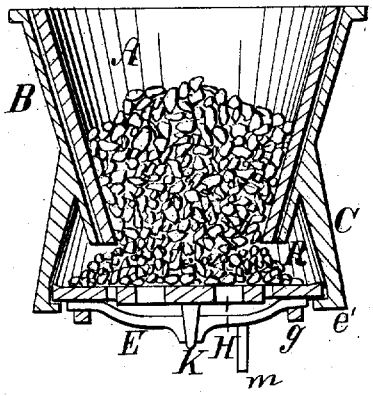
Figure 2:
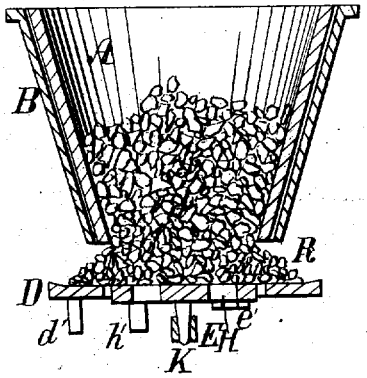
Figure 3:
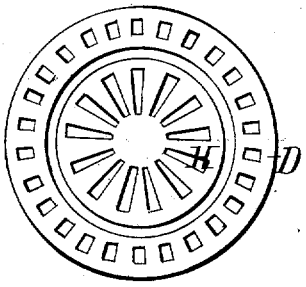
Figure 4:
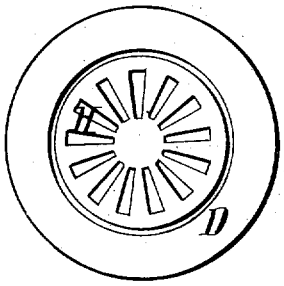
Figure 5:
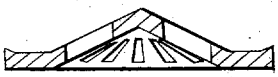

Figure 1 is a vertical section through the discharge end of the fire-chamber and grate, cut through the supporting-lugs. Fig. 2 is a similar section on a line between the supporting-lugs. Fig. 3 is a plan of the grate-surface. Fig. 4 is a plan of a grate-surface having a ring without apertures. Fig. 5 is a section through a grate having a raised center.

A is a fire-clay pot within the iron pot B. To the iron pot B are secured lugs C, projecting downward. The lower ends of these lugs have lips *e'* projecting beneath the ring D, which forms part of the grate-surface. This ring carries a bar, E, on its under side, pivoted in bearings *g*. The central portion, H, of the grate-surface turns upon a center-pivot, K, supported by the cross-bar E, and, by means of an arm, *m*, forming a part of the said cross-bar, the grate H is dumped. An eye, *d'*, is attached below the ring D, and a similar eye, *h'*, below the grate H, into which eyes the shaking-bar is inserted. This arrangement permits of the ring D and grate H being shaken separately or together, and the grate H dumped.

By making the grate-surface larger than the inside diameter of the discharge end of the fire chamber, the coals and cinders are prevented from falling out too easily when the fire is kindled. The draft passes to the fire through the grate and the opening R.

In a stove constructed in this manner, all the slate and clinkers can easily be removed from any part of the grate H or ring D, and the fire kept up continuously. If, however, the fire be suffered to die out, the grate H can be dumped in the usual manner and the refuse pushed from the surface of the grate-ring through the central opening.

It is evident that the grate H and ring D may be cast in one piece, as shown in Fig. 5, so as to shake together, in which case all the slate, clinkers, and cinders would be removed through the opening R. It is also evident that the grate-surface may be supported by lugs in the same manner from a grated or illuminating fire-chamber, in place of the imperforate one herein shown.

I claim—

1. The combination of a fire-chamber, a grate-surface or fire-bed projecting beyond the inside diameter of the slate and clinker discharge end thereof, the clinker-cleaning opening R, and grate-supporting lugs C, projecting from the fire-chamber, substantially as herein described.

2. The combination of a fire-chamber and a grate-ring, D, supported on a plane below the clinker-cleaning opening R by means of lugs C, projecting from the fire-chamber, substantially as herein described.

3. The combination of a fire-chamber, the grate-ring D, supported on a plane below the clinker-cleaning opening R by means of lugs C projecting from the fire-chamber, and a central vibrating or dumping grate, H, supported from the ring, substantially as herein described.

JAMES SPEAR.

Witnesses:
EDWARD BROWN,
JOHN F. GRANT.